United States Patent

[11] 3,582,141

| [72] | Inventor | Charles C. Kelsey, Jr. |
| | | Dearborn, Mich. |
| [21] | Appl. No. | 807,849 |
| [22] | Filed | Mar. 17, 1969 |
| [45] | Patented | June 1, 1971 |
| [73] | Assignee | Motion Industries Incorporated |
| | | Detroit, Mich. |

[54] AUTOMOBILE WHEEL
12 Claims, 10 Drawing Figs.

[52] U.S. Cl. .................................................. 301/64,
152/403, 301/65, 161/68
[51] Int. Cl. .................................................. B60b 3/12
[50] Field of Search ......................................... 301/63
DRS, 63 DS, 64 SWH, 35, 5, 6 E; 152/402, 403,
405, 396; 295/1, 78, 2, 8, 30

[56] References Cited
UNITED STATES PATENTS

| 435,672 | 9/1890 | Allen | 295/1 |
| 1,477,915 | 12/1923 | Seymour | 301/63(DD) |
| 2,229,724 | 1/1941 | Burger | 301/63(DRS) |
| 2,405,954 | 8/1946 | Hotlerith | 301/63(DRS) |
| 3,253,862 | 5/1966 | Watanabe | 301/65 |
| 3,498,678 | 3/1970 | Hawley | 301/63 |
| 2,654,686 | 10/1953 | Hansen | 161/68 |

Primary Examiner—Richard J. Johnson
Attorney—Bosworth, Sessions, Herrstrom & Cain ABSTRACT: A light and strong automobile wheel particularly adapted for race cars and other high performance automobiles comprising two rim members and a spider assembly in which the portion of the spider assembly between the hub and the outer rim-supporting ring or felly comprises a sandwich panel structure made up of outer skin members or panels with an intermediate honeycomb reinforcing structure in which the axes of the cells are parallel to the axis of the wheel. The parts, including the honeycomb material, preferably are composed of light metal such as an aluminum or magnesium alloy. The parts of the spider assembly are adhesively bonded together. The rim members are bolted to the rim supporting ring.

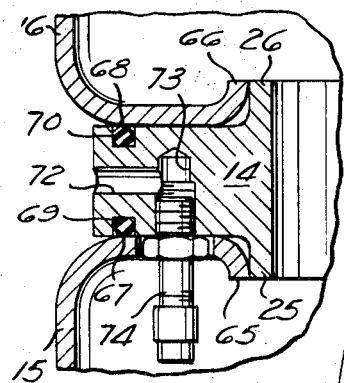
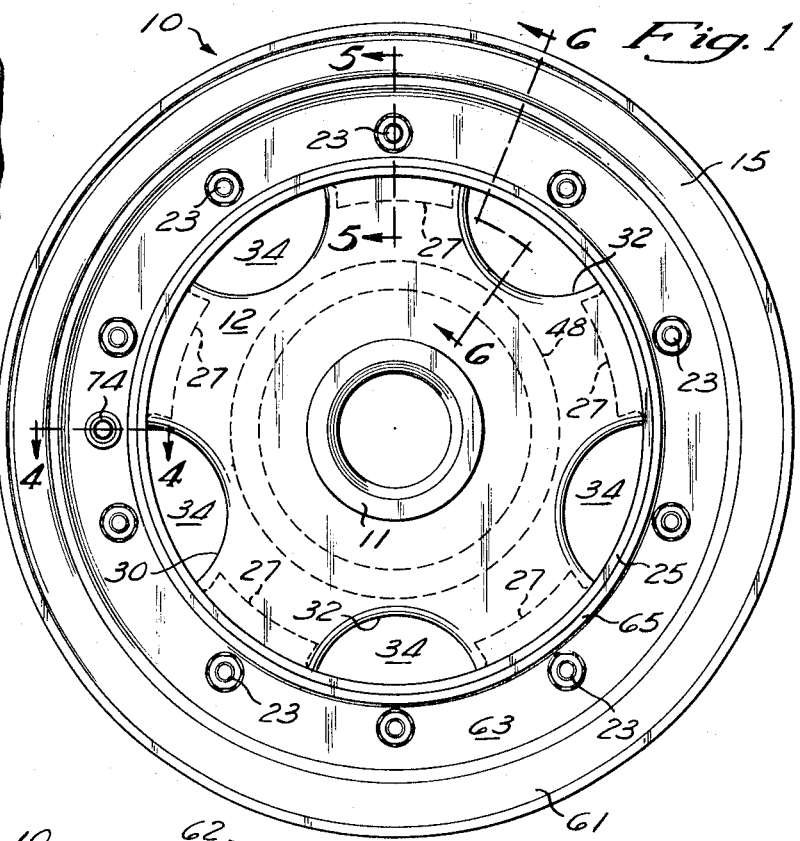
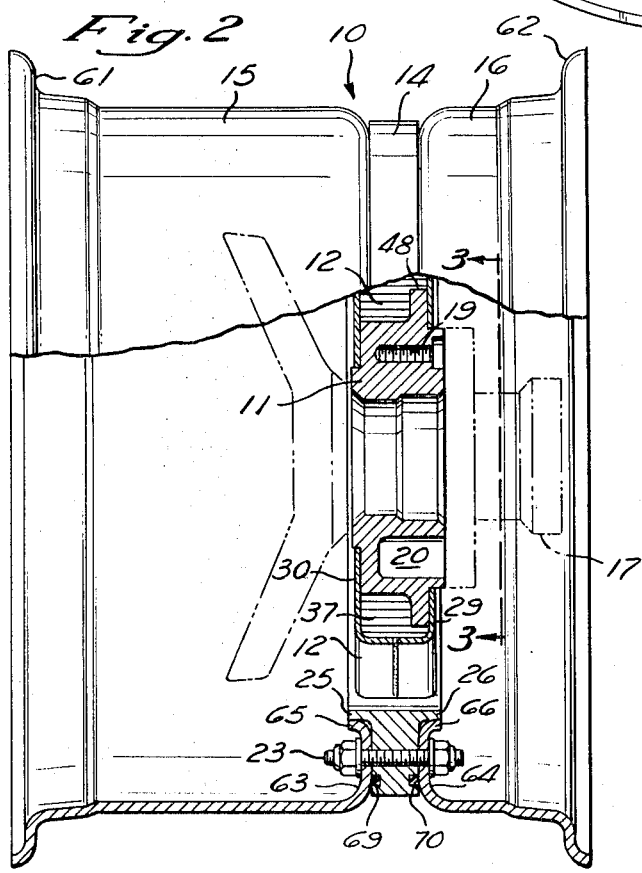
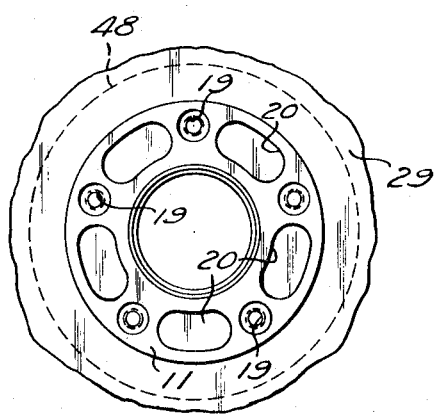
PATENTED JUN 1 1971
3,582,141
SHEET 1 OF 3
Fig.1
Fig.2
Fig.3
Fig.4
INVENTOR.
CHARLES C. KELSEY, JR.
BY Bosworth Sessions
Herschow + Coen
ATTORNEYS

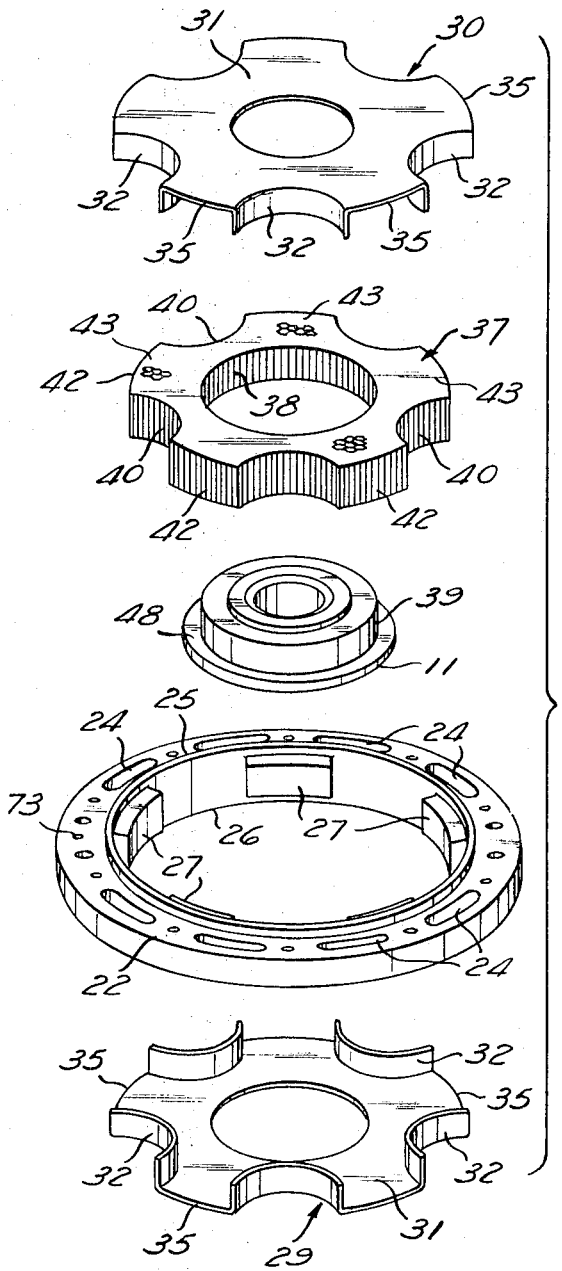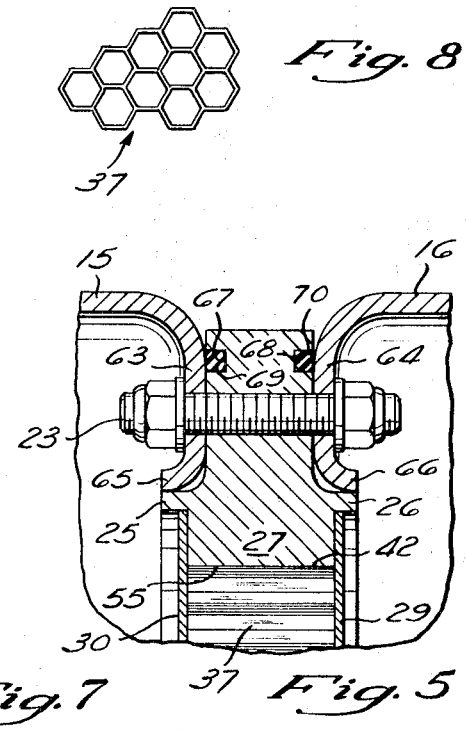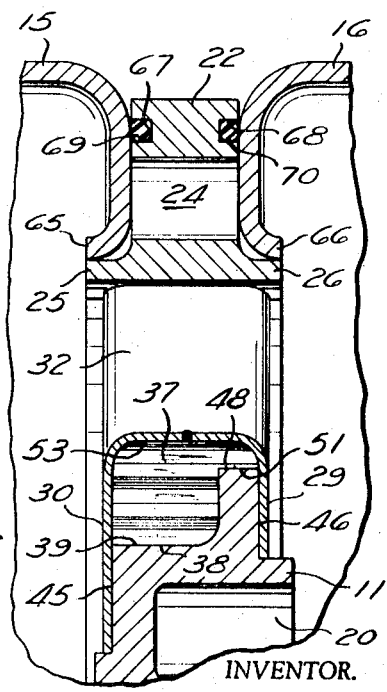

INVENTOR.
CHARLES C. KELSEY, JR.
BY Bosworth, Sessions
Herrstrom + Cain

ATTORNEYS 3,582,141

AUTOMOBILE WHEEL

BACKGROUND OF THE INVENTION

The present invention relates to wheels particularly adapted for race cars and other high performance automobiles. There has been a constant effort to improve the performance and handling characteristics of high performance automobiles. This has resulted in a search for lighter and stronger wheels and the necessity for strength has been greatly increased by the use of very wide rims and tires to secure better stability and increased adhesion to the road or track. In general, high performance cars have employed forged or cast light alloy wheels; these leave room for improvement both with respect to weight and strength and also with respect to the cost of manufacture and the fact that one particular wheel is adaptable to only one particular width and diameter of tire.

SUMMARY OF THE INVENTION

It is therefore an object of the present invention to provide an improved wheel, particularly adapted for high performance vehicles, that is light in weight, that can be manufactured at reasonable cost and in which a given basic wheel can be adapted for use with tires of different widths.

Briefly, according to preferred forms of the invention these and other objects and advantages of the invention are obtained by providing a wheel having a spider with a hub portion that is adapted to fit the particular type of automobile wheel spindle on which it will be mounted and with an outer rim supporting or felly portion to which two rim members are bolted. The intermediate portion of the spider assembly between the hub portion and the rim-supporting ring is a load-bearing panel consisting of a sandwich made up of relatively thin outer skin portions and an intermediate cellular reinforcing portion that is composed of a cellular metal such as aluminum with the cells preferably extending in a direction parallel to the axis of the wheel. The parts of the spider are adhesively bonded together. The rim members are bolted to the rim-supporting ring.

BRIEF DESCRIPTION OF THE DRAWINGS

FIG. 1 is a side elevational view of a preferred form of wheel made according to the invention.

FIG. 2 is an end elevational view partly in section of the wheel shown in FIG. 1.

FIG. 3 is a fragmentary view taken as indicated by the line 3-3 of FIG. 2.

FIG. 4 is a sectional detail of the rim-supporting ring and rim members showing the valve stem construction.

FIG. 5 is a sectional detail taken along the line 5-5 of FIG. 1.

FIG. 6 is a fragmentary sectional detail to the same scale as FIGS. 4 and 5 taken along the line 6-6 of FIG. 1.

FIG. 7 is an exploded view showing the parts making up the spider assembly of the wheel of FIG. 1 in perspective.

FIG. 8 is an end view of a sample of cellular material that is suitable for use in the wheel of this invention. This is not drawn to scale and no effort has been made to show the thickness of the metal and the size of the cells in correct proportion.

DESCRIPTION OF THE PREFERRED EMBODIMENTS

Figure 9:
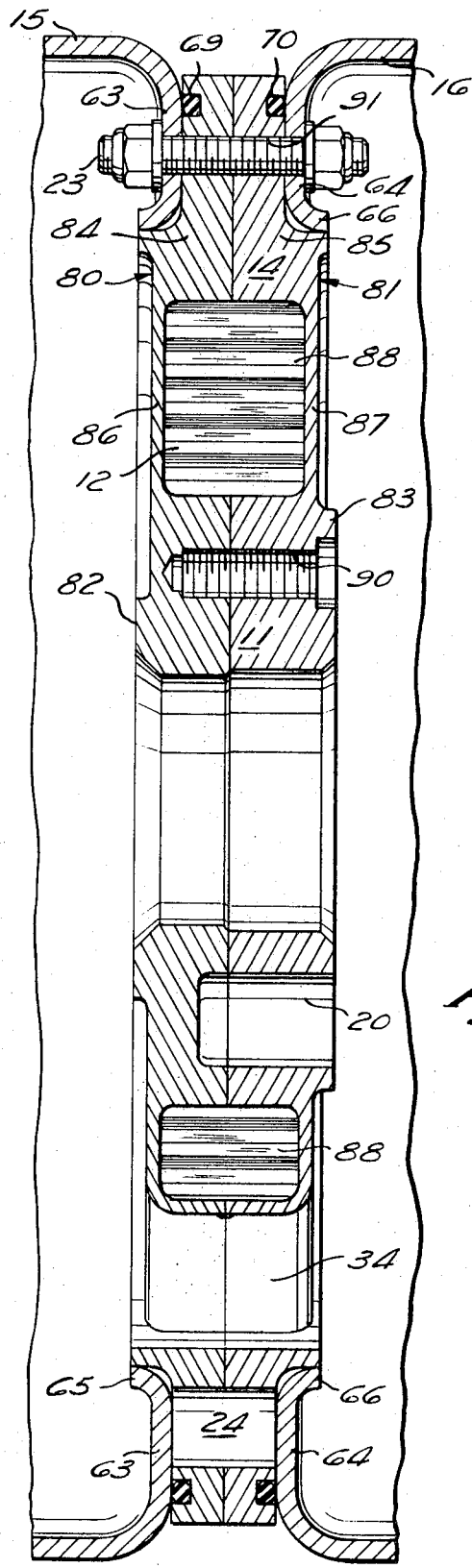
FIG. 9 is a sectional view similar to FIG. 2 but illustrating a modified type of wheel.

Referring particularly to FIGS. 1, 2 and 3 a wheel indicated in general at 10 and constructed according to one preferred form of this invention is made up of two rim members and a spider assembly, the spider assembly comprising a hub member 11, intermediate built-up sandwich panel member 12, and a rim-supporting ring 14. The two rim members 15 and 16 are bolted to the ring 14 as shown.

As shown particularly in FIGS. 2 and 3 the hub member 11 preferably takes the form of a forging composed of aluminum or other light alloy that has a configuration to fit the particular type of wheel spindle on which it will be mounted, for example the wheel spindle shown in broken lines at 17. The hub member 11 is shown here as adapted for use with a conventional knockoff type of securing means and with threaded recesses 19 into which driving pins may be inserted. The driving arrangement is optional and in many instances the drive pins will be supported in the hub portion of the wheel spindle and the pins will enter machined holes in the wheel. If knockoff hubs are not to be employed, the wheel can be constructed with bolt holes to receive conventional bolts such as are used on most commercial passenger car wheels. The bolts, however, will have to be of greater length than ordinarily employed because the hub member 11 is of much greater axial thickness than the usual stock car wheel. The hub member is preferably provided with milled-out recesses 20 to reduce the weight of the wheel.

The ring member 14 that supports the rim members 15 and 16 preferably takes the form of an aluminum or magnesium die casting and as shown in FIGS. 1 and 7 comprises an outer ring portion 22 to which the rim members 15 and 16 are bolted as described in greater detail below and which is provided with openings to receive the bolts 23 and with openings 24 to reduce the weight of the assembly. The outer ring portion terminates in oppositely extending axial flanges 25 and 26 and inside of the flanged portion there are inwardly projecting lugs 27 to which the intermediate member 12 is secured.

In order to provide a light and strong element and support for the ring member 14 from the hub member 11 the intermediate member 12 is built up as shown particularly in FIG. 7 from a pair of skin members 29 and 30, preferably taking the form of light metal stampings. Each of the members 29, 30 has a flat radially extending portion 31 and arcuate axially extending flanges 32. These provide the cutout portions 34 in the wheel and leave intermediate spoke portions 35 that are dimensioned to correspond to the lugs 27 on the ring member 14. It is evident that if desired or required for strength or any other reason the cutout portions could be omitted and the members 29, 30 could have circular peripheries in which case the lugs 27 would be replaced simply by a continuous inwardly extending annular portion on the ring 14.

In order to give the intermediate member 12 the required strength and also to dampen the transmission of vibrations and shocks from the rim members the space between the two members 29, 30 is filled with a cellular reinforcing member 37. Member 37 is composed of light guage light metal such as aluminum that is expanded to form open cells of generally hexagonal shape as shown in FIG. 8 that extend from one face of the member 37 to the other in a direction perpendicular to the faces and parallel to the axis of the wheel. This material is well known and is utilized extensively in the manufacture of panels for aircraft and other services where lightness and strength are required. In typical material of this type, the metal has a thickness of about 0.002 inches and there are approximately 64 cells per square inch of end faces of the material.

Cellular material of this type is shipped in a compressed condition with the cells flattened out. The user expands the material to open up the cells and the material can be readily machined by filling the cells with a molten wax or similar material which is allowed to harden and then the required machining operations to produce the desired shape are carried out. After the machining has been completed, the wax is melted out leaving the material with the cells empty and the machined piece ready for assembly with the other components of the wheel.

It should be noted that cellular material having a different configuration may be used in place of that described above. For example, the material may have a configuration in which the axes of the cells are not parallel to the axis of the wheel. Member 37 is cut so that its inner periphery 38 will conform to the outer cylindrical surface 39 of the hub member 11 while the outer periphery is cut out as at 40 to conform to the inner configuration of the flanges 32 of the skin members 30 while the ends 42 of the intermediate spoke portions 43 are dimensioned to abut against and conform to the inner surfaces of the lugs 27 of the outer ring member 14.

As shown particularly in FIGS. 2, 5 and 6, the parts of the wheel illustrated in FIG. 7 can be assembled with skin member 30 having its inner annular portion in engagement with the outboard radial annular face 45 of the hub member 11, and skin member 29, which has a larger central opening than the member 30, having its inner annular face in engagement with the annular radial surface 46 of the hub member 11, the hub member having an outwardly projecting flange 48 to provide the necessary area of contact in this region. The cellular filler material fits closely within the two skin members, its inner annular surface 38 engaging the hub portion 39 of the hub member 11 and this surface being cut away as at 51 to accommodate the flange 48 of the hub member 11.

The ends of the cellular elements of the filler member butt against the inner faces of the skin members 29 an 30 as shown particularly in FIG. 5 while the cutout portions 40 of the cellular filler conform to and engage the inner surfaces of the flanges 32 of the skin members as shown at 53 in FIG. 6. The end portions 42 of the filler member engage the inner surfaces of the lugs 27 of the outer rim member as shown at 55 in FIG. 5. It is to be noted that the cellular material can be formed without undue force and therefore by constructing the cellular material slightly larger than the space within which it is to fit the parts can be assembled without undue pressure and proper contact between the cellular material and the surrounding elements assured.

In assembling the parts an appropriate adhesive such as FM-1000 manufactured by the Bloomingdale Department of American Cyanamid Company is supplied to all of the surfaces that are to be in contact with each other prior to assembly. The parts are then assembled and baked to complete the bond in a known manner. Adhesives of the elastomeric film type may be employed. These require curing temperatures of about 360° F. which provides a bond of great strength, but the temperatures are low enough so that the characteristics of the metal are not adversely affected. This operation completes the entire wheel except for the rim members 15 and 16.

As shown particularly in FIG. 2 the rim members 15 and 16 are deep drawn stampings which also may be composed of a light metal or of steel with the usual tire-retaining flanges 61 and 62. The members also have inwardly extending flanges 63 and 64 respectively that engage opposite faces of the rim member 14. These flanges are perforated to correspond to the openings in the rim member 14 and receive the securing bolts and nuts 23. The flanges 63 and 64 terminate in short flanges 65 and 66 that extend in axial directions and engage the axially extending flanges 25 and 26 of the outer ring 14.

In order to provide for using tubeless tires, the ring 14 is provided with grooves 67 and 68 that receive conventional O-ring seals 69 and 70 respectively. These O-rings prevent leakage of air between the rim members 15 and 16 and the outer ring member 14. In order to provide for inflating the tire the ring member 14 has a radially extending bore 72 (FIG. 4) that intersects an axially extending bore 73. The radially extending bore 72 communicates with the interior of a tire placed on the wheel and intersecting bore 73 is threaded as shown to receive a conventional valve stem 74. This provides for easy inflation of the tire with a lightweight filling assembly that remains in fixed position so that the balance of the wheel itself is not changed when the tires are changed.

If tires with tubes are to be employed, one of the rim members may be perforated to accommodate a conventional valve stem.

It will be noted (FIG. 2) that rim member 15 is much wider than rim member 16. This provides a typical arrangement in which the center of the rim and the central vertical plane of the tire is offset from the plane of the wheel itself. Different cars require different types of offsets and different widths of rims. With the present invention a wheel can be adapted to receive tires of different widths and different offsets can be provided simply by employing different rim members. For example, for an ordinary passenger car another rim member essentially identical to rim member 16 might be employed in place of rim member 15. The present example illustrates a wheel having a 15 inch diameter and a rim having a 13 inch width. However, with the same diameter wheel tires as wide as 23 or more inches may be employed by substituting proper rim members for those illustrated in the drawings, while narrower tires could be employed by substituting a narrower rim member for the wider rim member shown.

Thus, the wheel just described provides a light, very strong construction which can be adapted for tires of various widths and with various offsets. The wheels may be mounted on appropriate wheel spindles in the usual fashion, either with typical knockoff hubs as used in race cars or with bolted on arrangements as in passenger cars. The rims may be adapted to different sizes of tires and changing of the tires on the wheel is comparatively easy because one of the rim members can be readily removed simply by releasing the nuts from one end of each of the bolts 23 and removing the rim member whereupon the tire can be readily withdrawn. To make it easy to remove one nut without disturbing the other the bolt 23 is preferably coated with an adhesive composition of known type that will prevent undesired loosening of the bolt in its threads but will permit the bolt to be removed if that becomes necessary.

Figure 10:
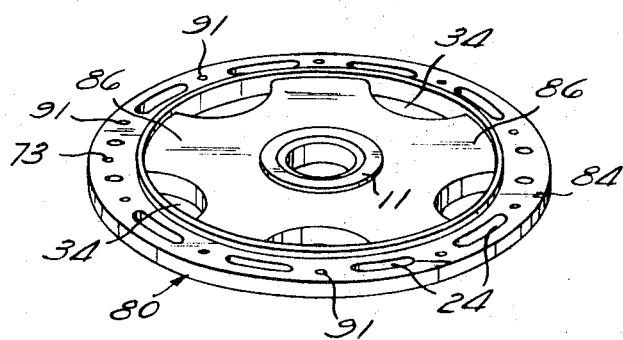
FIG. 10 is a view in perspective of one outer member of the spider assembly of the wheel of FIG. 9.

A somewhat modified form of the invention is shown in FIGS. 9 and 10. Here the ultimate configuration of the wheel is essentially the same as previously described and the rim members and bolts are the same and bear the same reference characters. However, in this case the spider itself is made up of two forged members 80 and 81. These have hub portions 82 and 83 respectively, outer rim supporting portions 84 and 85 respectively, and intermediate skin portions 86 and 87, respectively, The space between the skin portions 86 and 87 preferably is filled with a cellular honeycomb structure 88 similar in all respects to the cellular material heretofore described.

In the manufacture of this wheel, the parts 80 and 81 are preferably forged from a light alloy such as an aluminum or magnesium alloy, although for some purposes casting techniques may be employed to produce these parts. They are machined to proper dimensions and configurations as shown and are provided with weight reducing openings as in the previously described wheel. After the parts 80 and 81 are machined, a suitably formed cellular insert 88 is placed in the recesses in one of the parts and the other part is assembled with the first part and the cellular insert, suitable adhesives having been applied to the contacting areas of the parts and the insert. The entire assembly is then clamped together and the adhesive cured as before to produce an assembly as shown in FIG. 9. After the adhesive bonding of the parts of the openings 90 for the driving studs and the openings 91 for the rim-securing bolts are drilled and tapped in order to ensure that these holes will be accurately formed and that the threads will be continuous. Wheels of this type are more economical to manufacture because the cost of the tooling for forming the members 80 and 81 is less than the cost of the tooling for the individual members in the form of wheel first described herein.

While a preferred and a modified form and embodiment of this invention have been specifically illustrated and described herein changes and improvements will occur to those skilled in the art who come to understand its essential principals and accomplishments. This invention, therefore, is not to be confined to the specific forms herein specifically disclosed, nor in any other way inconsistent with the progress by which this invention has promoted the art.

I claim:

1. In a wheel for automotive vehicles an improved spider assembly comprising a hub, an intermediate section extending radially from said hub, said intermediate section comprising an inner cellular reinforcing structure formed of thin metallic sheets arranged to define a plurality of thin-walled open cells sandwiched in an outer metallic skin, and an outer rim-supporting ring extending radially from said intermediate section.

2. The spider assembly as claimed in claim 1 wherein said hub, said outer metallic skin, and said rim-supporting ring are formed in two annular sections having their axially innner faces bonded together, said thin-walled cells being sandwiched in said metallic skin and bonded thereto.

3. The spider assembly as claimed in claim 1 wherein said intermediate section is bonded to said hub and has a plurality of radially extending spokes, the radially outer periphery of each of said spokes being bonded to the radially inner periphery of said ring.

4. The spider assembly as claimed in claim 3 wherein the outer metallic skin of each of said spokes extends radially beyond the inner cellular material, and said ring is provided at its radially inner face with a plurality of inwardly extending lugs circumferentially positioned to coincide with said spokes, the outer metallic skin of each of said spokes fitting over one of said lugs and having its radially outer periphery bonded to the radially inner periphery of said ring adjacent said lug, the radially inner periphery of each of said lugs being bonded to the radially outer periphery of the inner cellular material of each of said spokes.

5. The spider assembly as claimed in claim 1 wherein said rim-supporting ring has an axially extending bore and a radially inwardly extending bore intersecting said axially extending bore, and further comprising a valve in said axially extending bore whereby air may be forced through said valve and out of said radial bore to inflate a tire mounted on said wheel.

6. The spider assembly as claimed in claim 1 wherein the cells of said reinforcing structure extend in a direction parallel to the axis of the spider assembly.

7. A wheel for automotive vehicles comprising a first rim member, a second rim member axially spaced from said first rim member, each of said rim members terminating at its axially outer periphery in a tire-retaining flange and having at its axially inner periphery a flange portion extending radially inwardly, a radially extending ring interposed between said flange portions, said ring having at its radially inner periphery axially extending flanges that seat on the radially inner edges of said flange portions, means for joining said ring to said flange portions at a plurality of circumferentially spaced locations on said flange portions, an intermediate section including a plurality of spokes, the radially outer periphery of each of said spokes being connected to the radially inner face of said ring, said intermediate section including an inner reinforcing structure formed of thin metallic sheets arranged to define a plurality of thin-walled open cells, and a central hub connected to said intermediate section for mounting said wheel.

8. The wheel as claimed in claim 6 wherein said second rim section is wider than said first rim section.

9. The wheel as claimed in claim 6 further comprising a first passage through one of said flange portions, a second passage extending axially into said ring, said first passage and said second passage being substantially aligned, a third passage in said ring extending radially inwardly from the outer periphery of said ring and intersecting said second passage and a valve extending through said first passage and into said second passage, whereby air may be forced through said valve and out of said third passage to thereby inflate a tire seated on said first and second rim members.

10. A wheel for automotive vehicles comprising a hub for mounting said wheel, an intermediate section bonded to said hub and extending radially therefrom, said intermediate section including a plurality of spokes, said intermediate section comprising an inner cellular filler of metallic material covered by an outer metallic skin, the outer metallic skin of each of said spokes extending radially beyond the inner cellular material of the spoke, an outer rim-supporting ring having at its radially inner periphery axially extending flanges and radially inwardly extending lugs, said lugs being circumferentially positioned to coincide with said spokes, the outer metallic skin of each of said spokes fitting over a circumferentially corresponding one of said lugs and having its radially outer periphery bonded to the radially inner periphery of said ring adjacent said lug, the radially inner periphery of said lugs being bonded to the radially outer periphery of the inner cellular material of said spokes, a first rim member, a second rim member, each of said rim members terminating at its axially outer periphery in a tire-retaining flange and having at its axially inner periphery a flange portion extending radially inwardly, said flange portions abutting axially opposite sides of said ring and having their radially innner edges seated on said axially extending flanges of said ring, means for joining said ring to said flange portions at a plurality of circumferentially spaced locations on said flange portions, a first passage through one of said flange portions, a second passage extending axially into said ring, said first passage and said second passage being substantially aligned, a third passage in said ring extending radially inwardly from the outer periphery of said ring and intersecting said second passage, and a valve extending through said first passage and into said second passage whereby air may be forced through said valve and out of said third passage to inflate a tire seated on said first and second rim members.

11. A wheel for automotive vehicles comprising first and second annular sections bonded together at their axially inner faces, each section including a hub portion, an intermediate portion extending radially from said hub portion and including a plurality of spoke portions, and a rim-supporting ring portion encircling the outer periphery of said spoke portions, said ring portion having at its radially inner periphery a flange extending axially outwardly, an inner cellular filler of metallic material interposed between said annular sections in said intermediate portions and bonded to said intermediate portions, a first rim member and a second rim member, each of said rim members terminating at its axially outer periphery in a tire-retaining flange and having at its axially inner periphery a flange portion extending radially inwardly, said flange portions abutting axially opposite sides of said ring and having their radially inner edges seated on said axially extending flanges of said ring, means for joining said ring to said flange portions at a plurality of circumferentially spaced locations on said flange portions, a first passage through one of said flange portions, a second passage extending axially into said ring, said first passage and second passage being substantially aligned, a third passage in said ring extending radially inwardly from the outer periphery of said ring and intersecting said second passage, and a valve extending through said first passage and into said second passage whereby air may be forced through said valve and out of said third passage to inflate a tire seated on said first and second rim members.

12. A wheel for automotive vehicles comprising first and second integral annular sections bonded together at their axially inner faces, each section including a hub portion, an intermediate portion extending radially from said hub portion and including a plurality of spoke portions, and a rim-supporting ring portion encircling the outer periphery of said spoke portions, said ring portion having at its radially inner periphery a flange extending axially outwardly, a first rim member and a second rim member, each of said rim members terminating at its axially outer periphery in a tire-retaining flange and having at its axially inner periphery a flange portion extending radially inwardly, said flange portions abutting axially opposite sides of said ring and having their radially inner edges seated on said axially extending flanges of said ring, and means for joining said ring to said flange portions at a plurality of circumferentially spaced locations on said flange portions.

UNITED STATES PATENT OFFICE
CERTIFICATE OF CORRECTION

Patent No. 3,582,141      Dated June 1, 1971

Inventor(s) Charles C. Kelsey, Jr.

It is certified that error appears in the above-identified patent and that said Letters Patent are hereby corrected as shown below:

On the cover sheet [73] "Motion Industries Incorporated Detroit, Mich." should read -- Motion Dynamics Corporation, Detroit, Mich. --.

Signed and sealed this 21st day of December 1971.

(SEAL)
Attest:

EDWARD M. FLETCHER, JR.
Attesting Officer

ROBERT GOTTSCHALK
Acting Commissioner of Patents